United States Patent Office 3,360,826
Patented Jan. 2, 1968

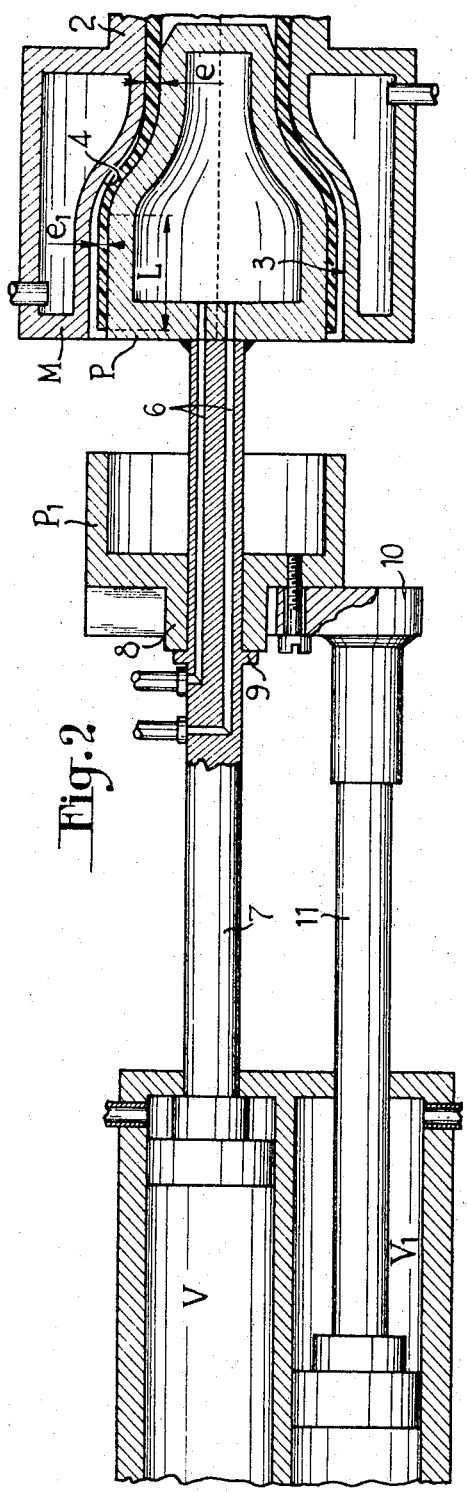
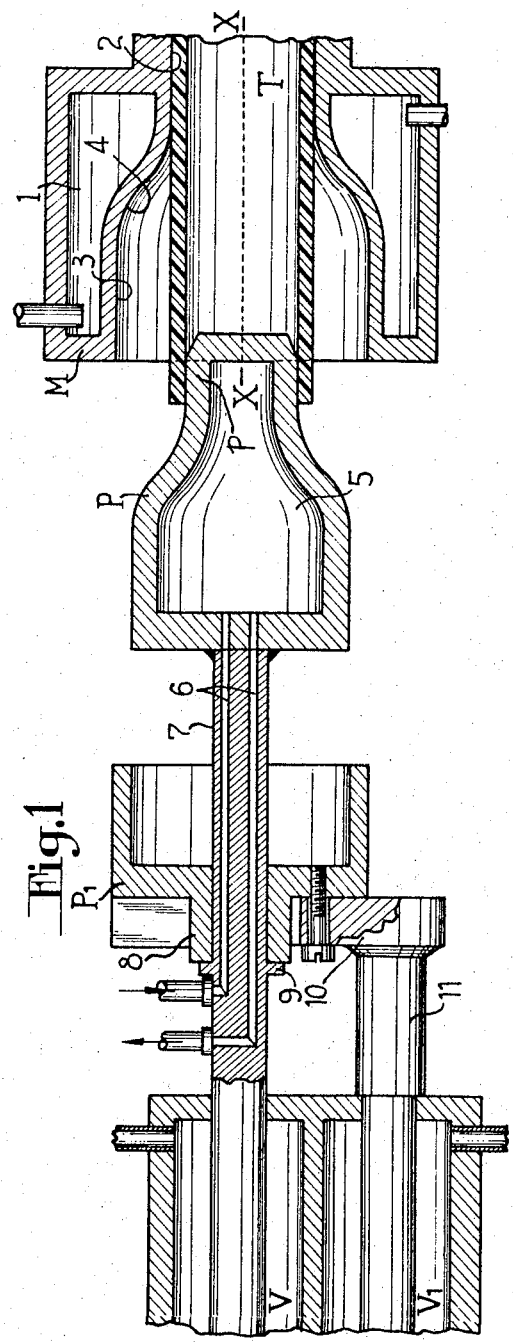

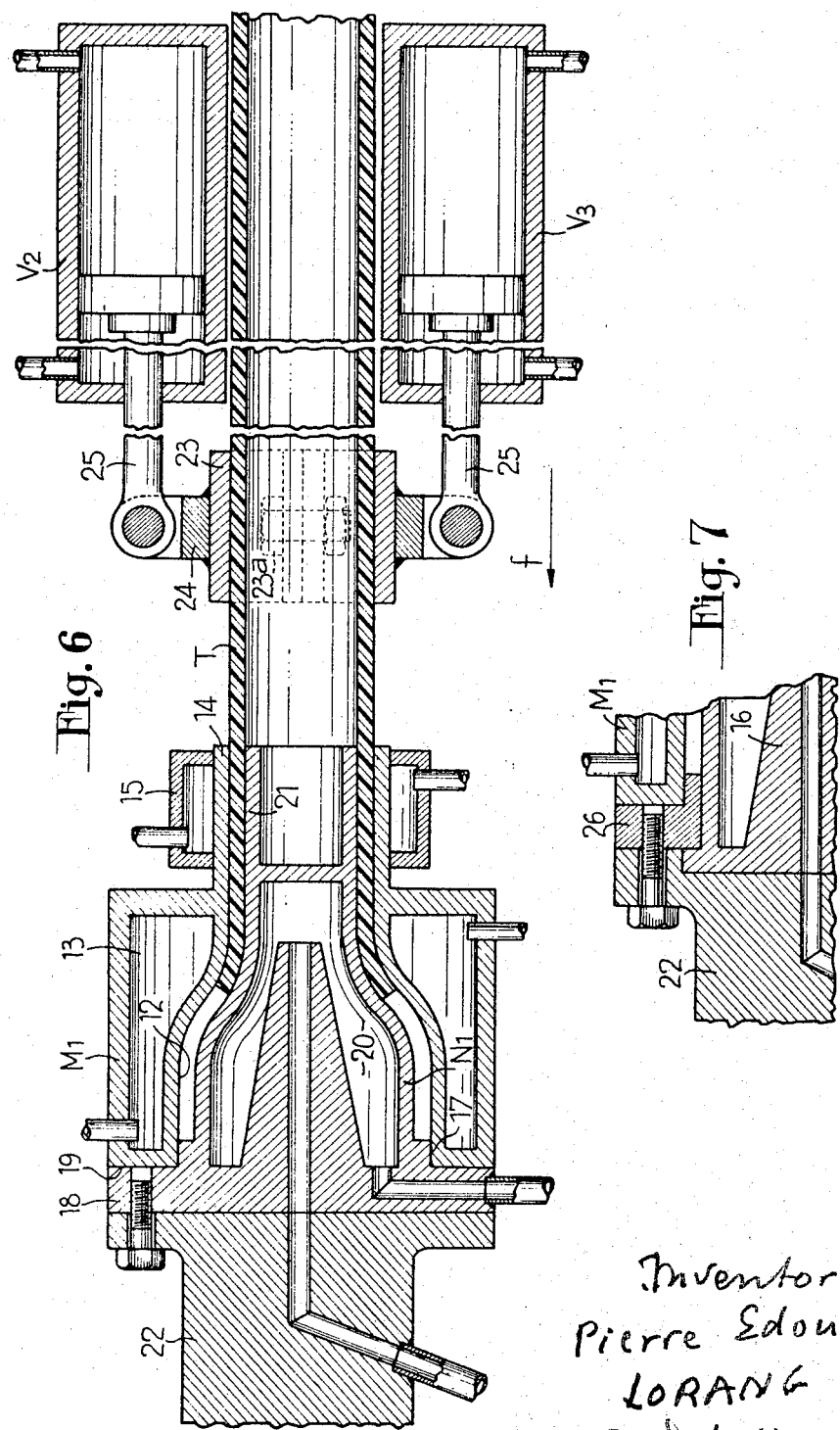

3,360,826
DEVICE FOR FORMING A SOCKET AT THE END OF A PIPE
Pierre Edouard Lorang, Nancy, France, assignor to Centre de Recherches de Pont-a-Mousson, Pont-a-Mousson, France, a French body corporate
Filed July 13, 1964, Ser. No. 381,977
Claims priority, application France, July 24, 1963, 942,480; May 26, 1964, 975,853
5 Claims. (Cl. 18—19)

The present invention relates to forming, by expansion, a socket at the end of a pipe of thermoplastic material such as rigid polyvinyl chloride or mixtures containing polyvinyl chloride or polyolefines, polystyrene, or cellulosic derivatives.

The object of the invention is to provide a new device for forming a socket at the end of a pipe of thermoplastic material which permits obtaining a controlled thickness of the wall of the pipe which is at least equal to that of the body of the pipe.

The use of the device according to the invention comprises first expanding the previously heated and softened end portion of the pipe inside a mould by means of a punch, then compressing the expanded part between the punch and the mould so that the space between the punch and mould is completely filled.

In one manner of using the device, the punch is axially moved relative to the mould so as to expand the end portion of the pipe and then the expanded part is compressed by axially upsetting the end of the pipe between the punch and the mould which are held stationary relative to each other.

In another manner of using the device of the invention, the end portion of the pipe is expanded between the mould and the punch which are coaxially stationary relative to each other, then the end of the pipe is axially compressed to a limited extent by exerting an axial upsetting thrust on the pipe which is longitudinally movable with respect to the mould and to a core which is fixed in the mould.

Another object of the invention is to provide a device comprising in combination, a mould whose inner face corresponds to the outer surface of the socket to be obtained, a male element coaxial with the mould and having the shape of the inner surface of the socket to be obtained and forming with the mould an annular space whose radial width is at least equal to the thickness of the wall of the body of the pipe, first means for expanding the end of the pipe in the space and second means for compressing the expanded part of the pipe in the space.

Further features and advantages of the invention will be apparent from the ensuing description with reference to the accompanying drawings to which the invention is in no way limited.

Figure 3:
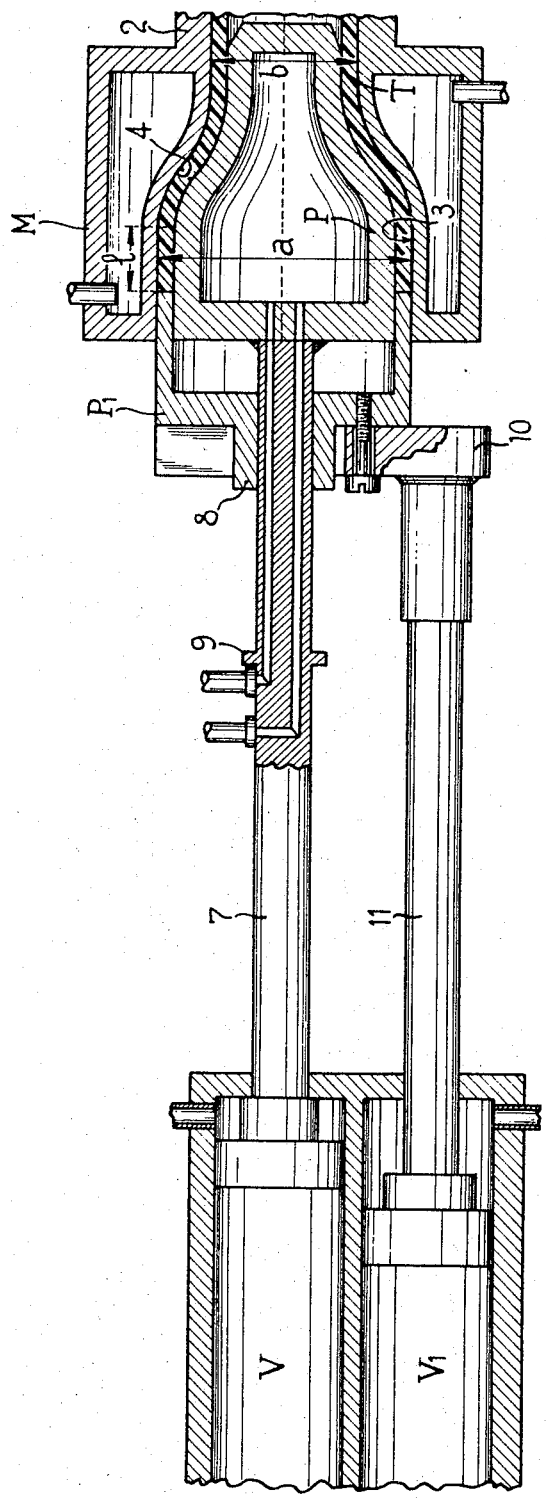
Figure 4:
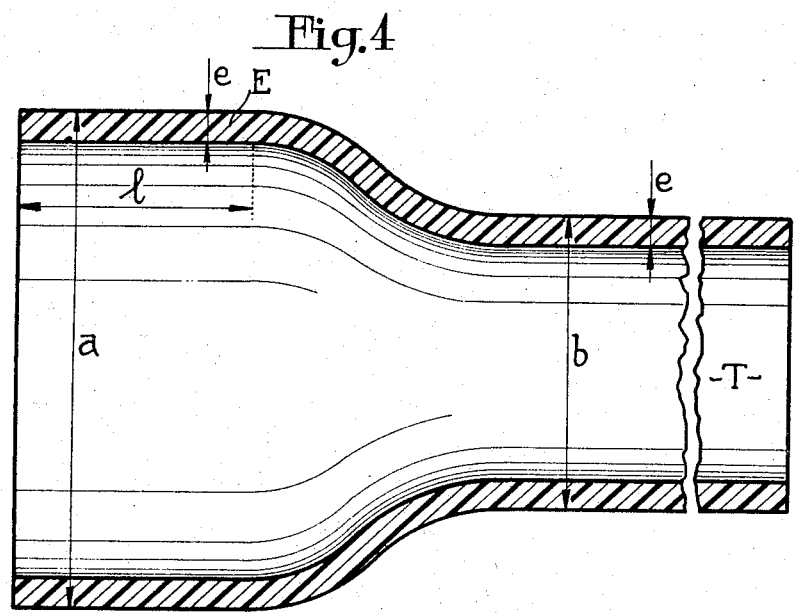
Figure 5:
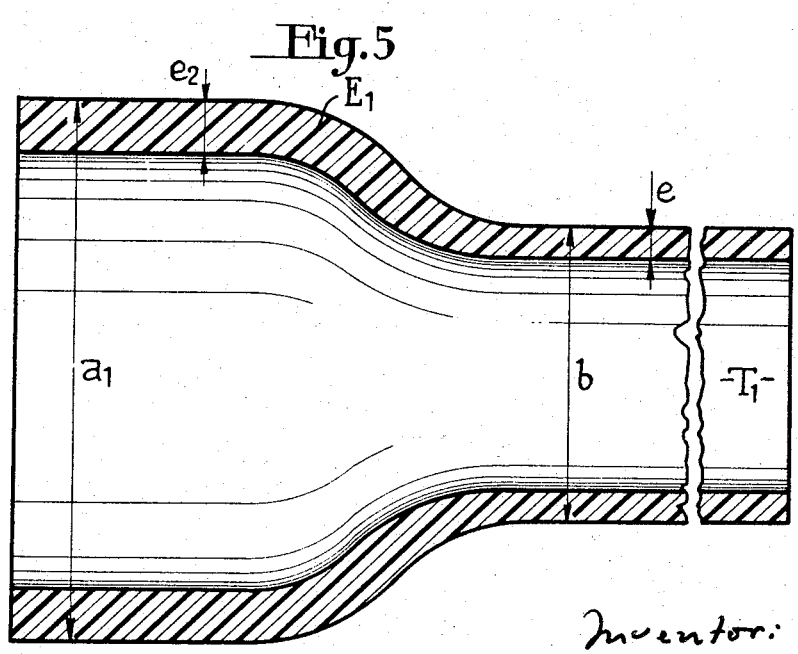
Figure 8:
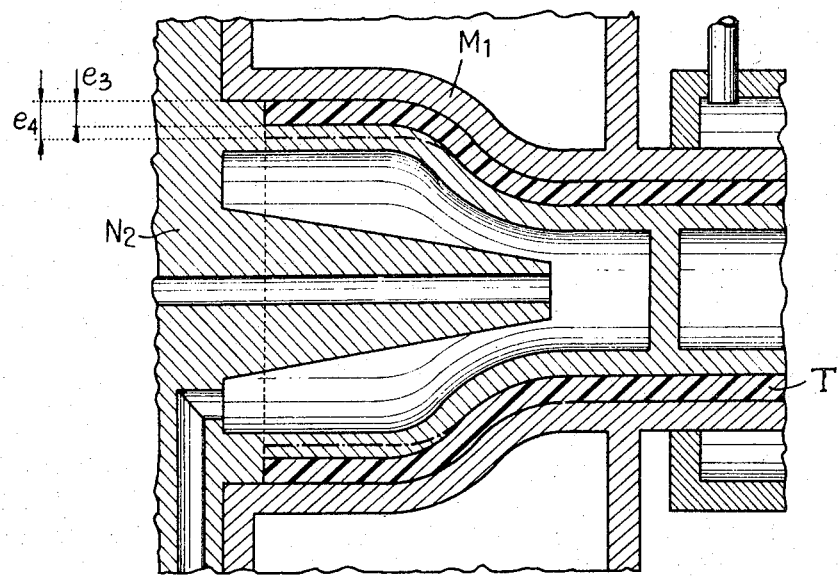
Figure 9:
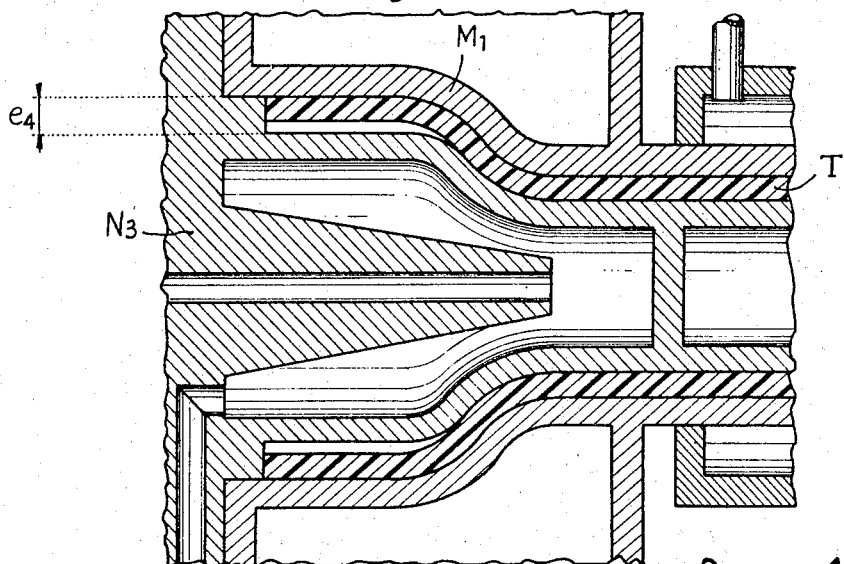

In the drawings:
FIG. 1 is a partial diagrammatic sectional view of a device according to the invention, at the beginning of the operation for forming the end of a pipe;
FIG. 2 is a view, corresponding to FIG. 1, of the device at the end of the expanding operation;
FIG. 3 is a view, corresponding to FIGS. 1 and 2, of the device at the end of the upsetting operation;
FIG. 4 is a sectional view of a pipe having a socket whose wall thickness is the same as that of the body of the pipe, this pipe having been obtained by means of the above-mentioned method;
FIG. 5 is a view similar to FIG. 4, of a pipe having a socket whose wall thickness exceeds that of the body of the pipe;
FIG. 6 is a partial diagrammatic sectional view of another device for carrying out the method of the invention, the thrust being exerted on the pipe;

FIG. 7 is a partial sectional view of another embodiment of the punch;
FIG. 8 is a diagrammatic sectional view of the forming operation with a first intermediate punch, and
FIG. 9 is a view similar to FIG. 8, after the second punch has been placed in position.

In the embodiment shown in FIGS. 1–4, the invention is applied to the enlarging of the cylindrical end portion of a pipe T of thermoplastic material, for example rigid polyvinyl chloride, for the purpose of obtaining a socket E (FIG. 4) whose outside diameter $a$ is much larger than the diameter $b$ of the body of the pipe but whose wall thickness $e$ is the same as that of the body of the pipe. The socket E has a cylindrical portion of axial length $l$.

For carrying out the invention, there is employed a device which comprises in combination: a metal mould M (FIGS. 1–3) of two parts which are united in a diametral plane X—X (FIG. 1) and are adapted to receive the end portion of the pipe T and to hold stationary the body of this pipe; a male element or punch P in the axial extension of the mould M, the outer face of this punch being progressively enlarged and corresponding to the inner surface of the socket to be obtained; a jack V for actuating the punch P; an annular piston $P_1$ for upsetting the end of the pipe in the annular space between the mould M and the punch P; and a jack $V_1$ for actuating the annular piston $P_1$.

The mould M comprises, for example, an outer heating and cooling jacket 1 through which circulates a suitable fluid, and a cylindrical inner face 2 forming gripping jaws for holding the body of the pipe T stationary. The contour of the mould corresponds to the outer surface of the socket to be obtained and comprises an enlarged portion 3 which is, for example, cylindrical, this portion being connected to the face 2 by a flared neck 4.

The punch P has a flared shape corresponding to the inner surface of the socket E to be obtained. Its end $p$, adapted to be part of the punch which is the first to enter the pipe T, has an outside diameter no greater than the inside diameter of the pipe T. The punch P comprises, for example, an inner cavity 5 whereby the punch can be heated and cooled by a circulation of a liquid through two conduits 6 communicating with the cavity 5. This punch is mounted on the end of a rod 7 of the piston of a jack V and the conduits 6 of the heating or cooling liquid are formed in this rod 7.

The annular piston $P_1$ coaxial with the punch P, has an inside diameter corresponding to the outside diameter of the punch and an outside diameter corresponding to the inside diameter of the moulding cavity 3 of the mould M. The piston $P_1$ is provided with a hub 8 which is slidable on the rod 7 of the jack V up to an abutment consisting of a shoulder 9 formed on this rod. This shoulder 9 separates the annular piston $P_1$ from the inlet and outlet conduits 6 of the heating or cooling liquid for the punch P. When the piston $P_1$ abuts this shoulder 9 (FIGS. 1 and 2) it is withdrawn from the punch P. The annular piston $P_1$ is shifted, for example, by a fork 10 which is engaged on the hub 8 and is rigid with the end of the rod 11 of the piston of a jack $V_1$.

This device is employed in the following manner:
First the end portion of the pipe T is heated to a suitable temperature over a length of the pipe corresponding to that which must be deformed so as to soften the thermoplastic material and facilitate its deformation while avoiding folding thereof in the course of the penetration of the punch P and the forward feed of the annular piston $P_1$. Thereafter, the pipe T is held stationary in the mould M and the jack V alone is actuated so as to enter the punch P in the end of the pipe T (FIG. 1), the jack $V_1$ being inoperative. As the punch P is fed forwardly at constant speed, it expands the end of the pipe T and the latter fits round the outer shape of the punch (FIG. 2). In the illustrated embodiment, the punch P carries along therewith the annular piston $P_1$ owing to the action of the shoulder 9. The travel of the jack V is so adjusted that at the end of the travel of the punch P the latter forms with the mould 1 in the zone of the flared neck portion 4 an annular space whose radial width equals the thickness $e$ of the wall of the pipe T. The feed of the punch P is then mechanically stopped, for example, by the fact that the jack V reaches the end of its travel.

At this stage, which is the end of the first expanding operation stage, the expanded end portion of the pipe T is of reduced thickness and does not occupy the entire radial width of the annular space between the punch P and the mould M. The expanded end has a cylindrical portion of length L which exceeds the length $l$ to be obtained, and a wall thickness $e_1$ which is substantially less than the wall thickness $e$ of the body of the pipe.

The second upsetting stage now commences.

While the jack V remains under pressure, the jack $V_1$ is actuated so as to feed the annular piston $P_1$ forwardly relative to the punch P.

The annular piston $P_1$ comes into contact with the end of the pipe T and upsets or urges it toward the body of the pipe and causes it to fill the annular space between the punch P and the mould M while decreasing its axial length. Owing to the suitable initial heating, the expanded part of the pipe T, while remaining malleable, conserves such plasticity that under the action of this axial upsetting, its length decreases and its thickness increases in compensating the decreasing length, the plastic material being radially distributed between the punch P and the mould M. Owing to the fact that the jack V is maintained under pressure, the punch P resists the thrust tending to urge it out of the mould which is exerted thereon by the plastic material of the pipe T in the region of the neck 4. The increase in the wall thickness owing to the upsetting of the end of the pipe by the annular piston $P_1$ stops only when the plastic material comes in contact with the inner face 3 of the mould M. It is consequently the complete filling of the annular space between the punch P and the mould M by the plastic material which causes the annular piston $P_1$ to stop, although its jack $V_1$ has not yet reached the end of its travel (FIG. 3). In this way, the socket shown in FIG. 3, which has a wall thickness equal to the radial width of the annular space between the punch and mould, is obtained. In the presently-described embodiment, this thickness is equal to the wall thickness of the body of the pipe.

This second stage being terminated, the cooling of the formed end can be accelerated, for example by circulation of a cooled liquid inside the punch P and mould M. Before opening the mould M and releasing the pipe T, it is necessary to wait until the temperature of the pipe T has dropped to such value that the rigid thermoplastic material has completely hardened and become stabilized. When this stabilization has been reached, the jacks $V_1$ and V are returned to their initial positions shown in FIG. 1, the mould M is opened and the formed socket is stripped therefrom.

The expanded socket then has the appearance shown in FIG. 4. Owing to the combined action of the punch P, the annular piston $P_1$ and the mould M, the socket E has a wall thickness $e$ equal to that of the body of the pipe. As can be seen, the thickness is obtained with accuracy by the filling of the annular space between the punch and the mould in the upsetting stage.

If an annular space is provided between the punch P and the mould M whose radial width exceeds the wall thickness $e$ of the body of the pipe and an annular piston $P_1$ having the corresponding dimensions is employed, the socket $E_1$ shown in FIG. 5 is obtained. The wall thickness $e_2$ exceeds that of the body of the pipe. It should be noted that the resistance of the socket $e_1$ to bursting pressures is, in respect of a suitably chosen thickness $e_2$, at least equal to that of the body of the pipe.

It is clear from the foregoing that the device according to the invention permit obtaining the desired thickness for the expanded socket.

In the embodiment shown in FIG. 6, the device comprises a fixed mould $M_1$ which can be of one piece, as shown, or of a plurality of pieces. It is held in any manner (not shown) and its inner face 12 has a profile corresponding to the outside profile of the socket to be obtained. This mould is provided with a chamber 13 through which it is possible to circulate a heating or cooling fluid. The mould $M_1$ is extended at the end thereof adjacent the body of the pipe by a cylindrical portion 14 surrounded by a sleeve 15 through which it is possible to circulate a cooling liquid.

Disposed in this mould is a metal inner core $N_1$ which forms a male element and whose outside profile corresponds to the inner profile of the socket to be obtained. This core is centered in the mould by means of a centering bearing face 17 and it is provided with a flange 18 which bears against the outer face 19 of the mould at the end thereof adjacent the expanded part of the contour of the mould. Provided within the core $N_1$ is a chamber 20 through which it is possible to circulate a heating or cooling fluid. In the region of the sleeve 15, the core is extended by a hollow cylindrical portion 21 which is not subjected to the heating means of the chamber 20. The flange 18 is secured to a head 22 subjected to the action of thrust means (not shown) which permit urging the core into and against the mould.

The pipe T at the end of which must be formed a socket is pripped by a split collar 23 which is tightened by means of a bolt 23$a$ or other means, and is reinforced by a ring 24 against which bear the rods 25 of two jacks $V_2$, $V_3$ disposed on each side of the pipe or tube and fed with fluid under pressure by a source (not shown). The dimensions of the clamping collar and the clamping of the latter are such as to exert on the pipe T an axial thrust in the direction of the mould, namely in the direction of arrow $f$, which is at least sufficient to result in the forming of the socket and the upsetting of the material in the mould.

The device operates in the following manner:

After having heated the end portion of the pipe or tube T to be formed so as to render it plastic, this end is introduced between the cylindrical part 14 of the mould and the cylindrical portion 21 of the core and then progressively fed in the direction of the mould by means of the jacks. While the pipe is being fed, the softened end is deformed and is expanded and the deformed part travels along the core. A certain decrease in the wall thickness occurs as the end expands. When the expanded portion of the pipe abuts the centering bearing face 17, the thrust is continued so that the plastic material gradually fills the whole of the empty space between the mould and the core and this increases the thickness of the socket. At the end of the operation the core is removed, the collar 23 is taken off, and the pipe is withdrawn longitudinally from the mould if the latter is in one piece or laterally from the mould after opening the latter if it is composed in the known manner of a plurality of elements which may be pivoted together.

Thus the variant of the manner of carrying out the invention just described and the corresponding device considerably simplify the device relative to that of the first embodiment, since only a single continuous thrust is required instead of separate movements of the core or punch, on the one hand, and of the piston on the other.

Further, the applicant has noticed that the fact of exerting the thrust on the pipe surprisingly permits reducing to a large extent the force to be exerted to obtain the socket. In the first embodiment, this force can be as much as, for example, 30,000 daN (about 30 $t$ force) to form a socket in the end of a pipe whose inside diameter is 50 mm. and whose wall thickness is 2.5 mm. With the device shown in FIG. 7, the force required is as little as ⅓ to ¼ of said force.

Moreover, this embodiment is particularly advantageous when it is required to form a socket at the end of a pipe in which the ratio of the wall thickness of the pipe to its outside diameter is of the order of 1:20 and less. Indeed, with such small thicknesses of around 2–4 mm. the required dimensions of the annular upsetting piston of the first embodiment result in a thin member whose rigidity is not longer sufficient so that this piston is liable to become wedged or may even twist or break when it is introduced between the punch and the mould. The embodiment shown in FIG. 6 permits eliminating this annular upsetting piston and consequently the sole fragile member of the device.

It will be observed, moreover, that in the case of a thin pipe, that is, when the ratio between the wall thickness and diameter thereof is of the order of 1:20 and less, the method according to the described variant even permits dispensing with the heating of the end portion of the pipe or tube. The heat transmitted by the heated mould end 4 together with the heat generated by the rubbing of the pipe on the core are sufficient to heat and soften the material of the pipe.

FIG. 7 shows a variant of the core in which the annular abutment, instead of formnig an integral part of the core as the abutment 17 shown in FIG. 6, is composed of separate ring 26 secured to the core. This variant facilitates replacing this member in the case of wear.

In the embodiments described, hereinbefore, the socket-forming operation consists of an expanding operation followed by a single upsetting operation. This manner of proceeding permits easily obtaining sockets whose wall thickness is equal to the thickness of the body of the pipe. However, it has been mentioned that the invention also permits obtaining sockets whose wall thickness exceeds that of the body of the pipe, which is, for example, the case when it is desired to obtain a socket strength which corresponds to that of the body of the pipe, namely the case in which it is necessary to maintain a constant ratio between the wall thickness and pipe diameter. The applicant has observed that in this case the empty space between the core and the mould is large bearing in mind the reduced thickness which results from the expansion of the socket, and it might be feared that in this case, in the course of a single upsetting operation, folds which impair the serength of the socket might be formed. Generally, when the increase in thickness does not exceed 50% of the reduced thickness obtained in the course of the expansion, the upsetting operation can be carried out in a single operation. On the other hand, if this increase in the thickness exceeds 50%, it is advantageous to carry out the upsetting in a plurality of operations by employing for each operation cores whose dimensions are such that the upsetting operation does not result in an increase in thickness which exceeds 50%.

FIGS. 8 and 9 show the procedure adopted in the case of two successive upsettings. According to the arrangement shown in FIG. 8, the procedure is as indicated hereinbefore, the mould $M_1$ having a contour corresponding to the outside profile of the socket to be obtained and the core $N_1$ having an outside profile which is such that it forms with the inner face of the mould a space whose radial width $e_3$ is less than the wall thickness $e_4$ to be obtained and results in an increase in the thickness of the wall of no more than 50%. In the course of a first operation, the socket is formed and the plastic material is upset in the empty space thus provided. The thrust exerted on the pipe is stopped in the case of the use of the device shown in FIG. 6, or the annular piston and the punch are withdrawn in the case of the use of the first embodiment shown in FIGS. 1–3, and the punch and the core are replaced by a second punch or a second core $N_3$ whose outside profile is such that it forms with the inner face of the socket a space whose radial width $e_4$ corresponds to the final wall thickness to be obtained, the pipe being left in the mould. The upsetting operation is then resumed either by acting on the annular piston in the case of the first embodiment or by once more exerting the thrust on the pipe in the case of embodiment shown in FIG. 6, until the plastic material has completely filled the free space between the core and the punch.

It will be understood that in the case of the first embodiment, both the punch and the annular piston are to be changed so that the thickness of the annular piston corresponds to the radial width of the free space between the mould and the punch.

Although specific embodiments of the invention have been described, many modifications and changes may be made therein without departing from the scope of the invention as defined in the appended claims.

Having now described my invention what I claim as new and desire to secure by Letters Patent is:

1. Device for forming a socket in the end of a thermoplastic pipe of uniform thickness consisting of the combination of a mould having a first inner face corresponding to the outer face of the socket to be obtained and a second inner face which is cylindrical and axially adjoins the first inner face and has the same diameter as the outside diameter of the body of the pipe, a male element coaxial with the mould and having a first outer face having the shape of the inner face of the socket to be obtained, said first outer face of the male element forming with said first inner face of the mould an annular space whose radial width is at least equal to the thickness of the wall of the body of the pipe, first means for effecting an axial relative displacement between the pipe and the male element to insert said male element inside the pipe and expand the end of the pipe in said space, and second means for axially compressing the expanded part of the pipe in said space, said male element being flare-shaped and progressively enlarged, with a second forward outer face which is cylindrical and axially adjoins the first outer face, said second outer face having an outside diameter no greater than the inside diameter of the pipe for initially penetrating in and supporting said pipe before expansion of said pipe by said male element.

2. Device as claimed in claim 1, in which said male element is a punch.

3. Device as claimed in claim 1, in which said male element is a core fixed in the mould, and in which said first and second means consist of a jack connected to the pipe for shifting the pipe longitudinally of said mould and core, said core further comprising an annular abutment in said annular space, against which the expanded end of the pipe is axially compressed in said space by the action of said jack.

4. Device as claimed in claim 3, wherein the core has a flange bearing against the end face of the mould and has a bearing face portion for centering the core in the mould, the bearing face portion forming said abutment for said expanded end of the pipe.

5. Device as claimed in claim 3, comprising a collar capable of being clamped onto the pipe and constituting said means connecting said jack to the pipe.

References Cited

UNITED STATES PATENTS

| | | | |
|---|---|---|---|
| 2,361,933 | 11/1944 | Ferla | 25—30 |
| 2,433,546 | 12/1947 | Cornelus | 18—19 XR |
| 2,850,796 | 9/1958 | Kaplowitz | |
| 2,962,408 | 11/1960 | Fourmanoit | 25—39 |
| 2,977,633 | 4/1961 | Breitenstein | 18—19 XR |
| 3,013,310 | 12/1961 | Foster. | |
| 3,237,243 | 3/1966 | Saumslegle et al. | 18—19 XR |

WILLIAM J. STEPHENSON, *Primary Examiner.*

ROBERT F. WHITE, *Examiner.*

R. KUCIA, *Assistant Examiner.*